June 9, 1942.　　　A. R. PATRICK　　　2,285,781
AUTOMOBILE BRAKE CONTROL
Filed July 30, 1941
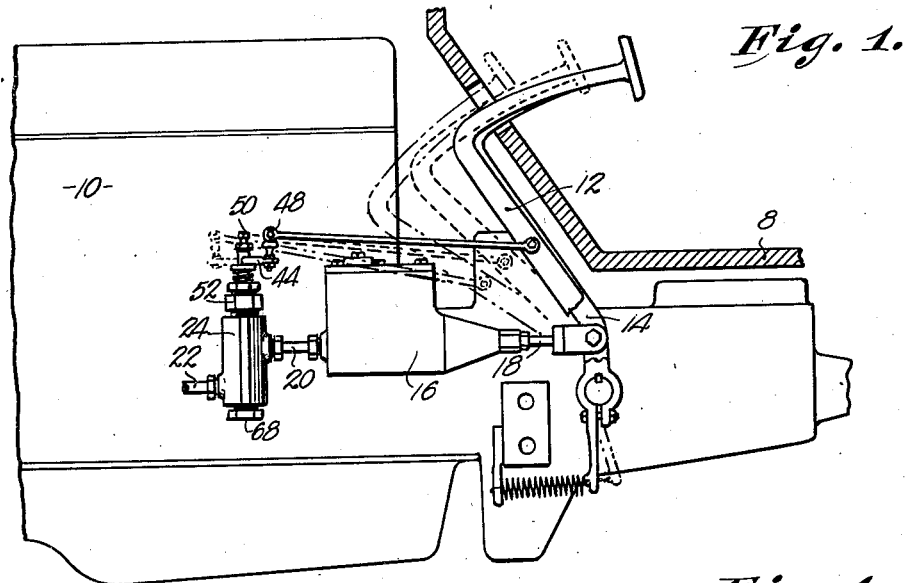
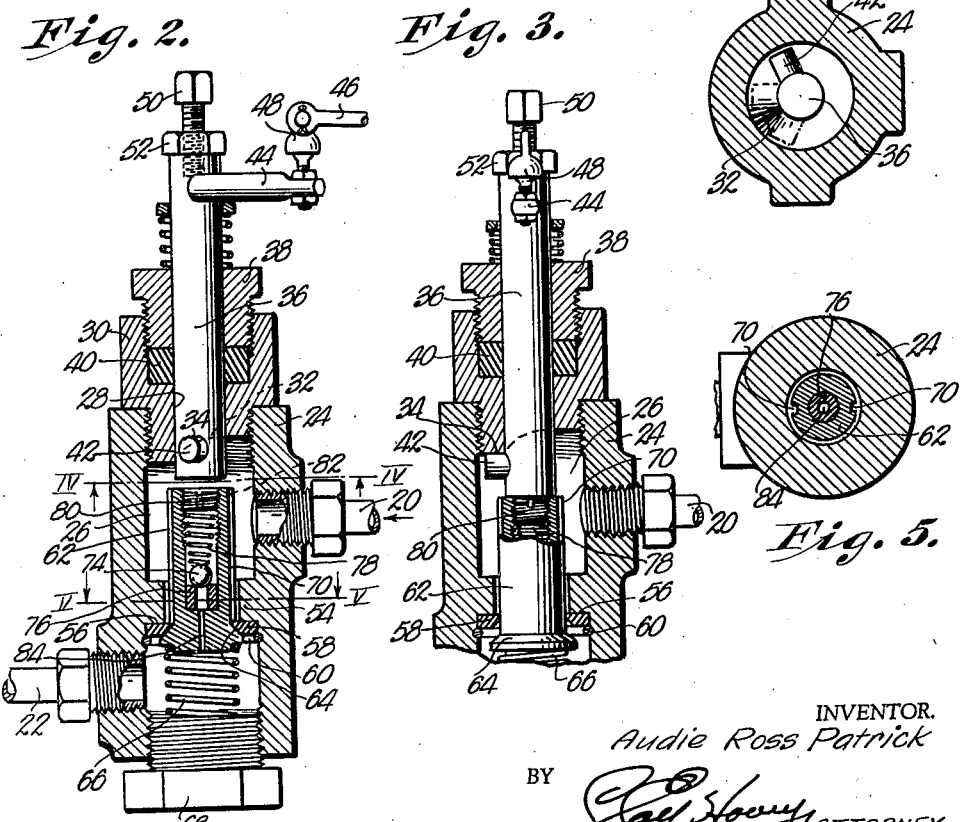
INVENTOR.
Audie Ross Patrick
BY
ATTORNEY.

Patented June 9, 1942

2,285,781

UNITED STATES PATENT OFFICE 2,285,781

AUTOMOBILE BRAKE CONTROL

Audie Ross Patrick, Kansas City, Mo.

Application July 30, 1941, Serial No. 404,593

7 Claims. (Cl. 188—152)

This invention relates to brake systems of automobiles and has for its primary object, the provision of a control attachment that may be applied to the conventional fluid brake systems of automotive vehicles, which attachment is operative to preclude accidental movement of the vehicle after the fluid brakes have been applied through appropriate manipulation of the clutch pedal by the operator.

One of the important aims of the instant invention is the provision of extremely simple, unique, durable and efficient mechanism in an automobile brake control, which mechanism is attached to the conventional clutch pedal in a manner as to cause actuation thereof to release the brake from the applied position when the clutch pedal is moved to a normal station, or further depressed after the same has reached a point in its path of travel where the clutch is disengaged.

This invention has for a further object, the provision of control means for braking systems of automobiles, which means may be built into the fluid braking system when originally installed in a new vehicle, or associated with the braking system as an accessory, all without an appreciable amount of effort or the expenditure of large amounts of money.

Another object of the instant invention is the provision of means for cooperating with the braking system of an automobile, which prevents release of the brakes from the applied position until the clutch pedal is moved to a point where the automobile is being driven forward by power transmitted from the engine thereof through the clutch, which control means comprises a unique, novel and efficient valve therein, equipped with a relief element whereby when the fluid has its pressure raised for any reason, said pressure will be relieved and a quantity of the fluid allowed to pass back to the master cylinder from the braking system adjacent to the wheels.

Another aim of the instant invention is to provide in a braking system, unique equipment, attachable to the clutch pedal of the automobile that comprises a rotatable control shaft, movable about its axis as well as longitudinally, which control shaft is influenced by a cam causing longitudinal movement toward and from a valve member normally held in the seated position by resilient means, said valve member and control shaft being in longitudinal alignment whereby to provide strong, durable and inexpensive apparatus capable of performing the duty of preventing accidental movement of the vehicle brakes from the set position after they have once been applied, until the clutch pedal is moved for the purpose of placing the automobile in motion.

Minor objects of the invention including specific details of construction not hereinabove mentioned, but which will appear during the course of the following specification, referring to the accompanying drawing wherein:

Fig. 1 is a fragmentary side elevational view of a portion of an automobile, illustrating in a diagrammatical manner, the way in which the brake control embodying this invention, may be associated with the brake system and the clutch pedal of the automobile.

Fig. 2 is an enlarged fragmentary longitudinal sectional view through the control means.

Fig. 3 is a similar section showing the control shaft in a position to unseat the valve member.

Fig. 4 is a cross sectional view taken on line IV—IV of Fig. 2; and

Fig. 5 is a similar sectional view taken on line V—V of Fig. 2.

The automobile generally designated by the numeral 8 has an internal combustion engine 10, a clutch pedal 12 and the usual fluid braking system which includes the brake pedal 14 connected to the master cylinder 16 by plunger 18.

As indicated in Fig. 1, the brake control forming an embodiment of the instant invention, may be attached to master cylinder 16 through the medium of tube 20 already forming an integral part of cylinder 16.

When installed as illustrated and contemplated by the preferred embodiment of the invention, tube 20 continues to the brakes of the automobile as at 22 and fluid from master cylinder 16 is forced through tubes 20 and 22 to the brakes, not here shown, when brake pedal 14 is depressed to move plunger 18. In equipment of the general character embodying the instant invention, it is desirable to incorporate unique means for preventing the release of the brakes from the applied position until the driver of automobile 8 moves clutch pedal 12 to proceed in the normal way, or to purposely allow the automobile to coast in a forward or backward direction. The particular control means illustrated in Figs. 2 to 5 inclusive, permits such action and the same comprises a body 24 preferably cast with a passage 26 longitudinally therethrough, that communicates with tubes 20 and 22 to complete a conduit for the braking fluid. A bore 28 is formed through section 30 of body 24 on the longitudinal axis thereof, as distinctly shown in Figs. 2 and 3.

This section 30 has a cam face 32 developed on the inner edge thereof, that is engaged by shoulder 34 created on control shaft 36 journalled in section 30 and held therein by packing nut 38. Conventional packing 40 precludes leakage around control shaft 36. The pin 42 that is employed to create shoulder 34 projects radially from shaft 36 near the inner end thereof and arm 44 disposed radially on shaft 36 at the outer end thereof, is attached to connecting rod 46 through the medium of a universal joint 48.

Set screw 50 and lock nut 52 form means whereby arm 44 may be secured in the desired position with joint 48 a predetermined distance from shaft 36 to increase or decrease the rotary motion thereof when clutch pedal 12 is manipulated, as hereinafter described.

Passage 26 extending longitudinally through body 24, is restricted by a partition or the like 54 that establishes a valve seat 56 covered by a resilient member 58 that is secured by split ring 60. A unique valve member, generally designated by the numeral 62, is in longitudinal alignment with shaft 36 and is formed as detailed in Fig. 2. This cylindrical valve member has an annular shoulder 64 thereon that is normally held against valve seat 56 by a spring 66 maintained in place within passage 26 by threaded plug 68.

Valve member 62 is longitudinally slidable in that portion of passage 26 formed in partition 54. When it is in the position shown in Fig. 3, a plurality of longitudinal grooves 70 permit the passage of oil from master cylinder 16 through tube 20 to tube 22 and thence to the brakes. If the brakes are set and friction creates heat to the extent of raising the pressure in the system between body 24 and the brakes joined by tube 22, the back pressure will be relieved when ball 74 is forced from its seat 76. This ball is maintained against seat 76 by spring 78, adjustably mounted within hollow cylindrical valve member 62 by threaded plug 80 having a hole 82 therethrough. A duct 84 at the opposite end of valve member 62 from plug 80 completes the passage through said valve member and allows excessive back pressure to be relieved.

When clutch pedal 12 is in the normal position shown in full lines of Fig. 1, the parts of the brake control are as shown in Fig. 3. Valve member 62 is held away from seat 56 and fluid is free to flow through passage 26 and tubes 20 and 22. When clutch pedal 12 is depressed to the dotted line position shown in Fig. 1, control shaft 36 is moved from valve member 62, and the latter is on seat 56. If the brakes have been applied by operating pedal 14, fluid cannot pass back into master cylinder 16 until valve member 62 has been unseated—such unseating will occur either when clutch pedal 12 is returned to the normal full line position shown in Fig. 1, or when the driver further depresses clutch pedal 12 to the position shown in dot and dash lines of Fig. 1. Such action is due to the effect of cam 32 upon shoulder 34 as control shaft 36 is rotated about its axis. The necessary longitudinal movement is imparted to shaft 36 as it is rotated by the aforesaid manipulation of clutch pedal 12.

When the clutch pedal is in the position illustrated by the dot and dash lines, valve member 62 is lifted from seat 56. The brake may then be released, if desired, to permit coasting while the clutch is yet in a disengaged condition.

The illustrated form of the invention does not distinctly reveal the manner in which the body 24 is rigidly mounted but it is quite apparent to one skilled in the art that the same should be securely bracketed to the frame of the automobile adjacent to or at a point operably close to the master cylinder. Any means of attachment may be used and since such means must be altered to suit conditions in each installation and further in view of the fact that the manner of attaching the body forms no part of the invention, it is deemed adequate that installation may be made as desired so long as a rigid mounting for the body is afforded.

Only the preferred embodiment of the invention has been illustrated and described, and since it is clear to one skilled in the art that modifications might be made without departing from the spirit of the invention and it is desired to be limited only by the scope of the appended claims.

Having thus described the invention, what is claimed as new and desired to be secured by Letters Patent is:

1. In an automobile provided with a fluid braking system and a clutch pedal, control means cooperating with the braking system to prevent release of the brakes from the applied position, said control means comprising a body having a passage therethrough for the fluid of the braking system; a valve seat formed in the body within the passage; a valve member in the passage; a spring to yieldably hold the member on said seat to prevent the flow of fluid in a direction to release the brakes; and a control shaft provided with a shoulder extending longitudinally of the passage, said valve member being in the form of a cylinder in longitudinal alignment with the control shaft, said body having a cam face over which said shoulder rides as the control shaft is rotated, said cam face being formed to shift the said shaft longitudinally toward the valve member a distance sufficient to move the valve member from the valve seat as the shaft is rotated in one direction about its axis.

2. In an automobile provided with a fluid braking system and a clutch pedal, control means cooperating with the braking system to prevent release of the brakes from the applied position, said control means comprising a body having a passage therethrough for the fluid of the braking system; a valve seat formed in the body within the passage; a valve member in the passage; a spring to yieldably hold the member on said seat to prevent the flow of fluid in a direction to release the brakes; and a control shaft for moving the valve member from the valve seat, said valve member having a bore therethrough and a relief valve in the bore.

3. In an automobile provided with a fluid braking system and a clutch pedal, control means cooperating with the braking system to prevent release of the brakes from the applied position, said control means comprising a body having a passage therethrough for the fluid of the braking system; a valve seat formed in the body within the passage; a valve member in the passage; a spring to yieldably hold the member on said seat to prevent the flow of fluid in a direction to release the brakes; and a control shaft provided with a shoulder extending longitudinally of the passage, said valve member being in the form of a cylinder in longitudinal alignment with the control shaft, said body having a cam face over which said shoulder rides as the control shaft is rotated, said cam face being formed to shift the said shaft longitudinally toward the valve member a distance sufficient to move the valve member from the valve seat as the shaft is rotated in one direction about its axis, said valve member having a bore therethrough and a relief valve in the bore operable when the valve member is seated and upon creation of back pressure in the braking system sufficient to actuate the relief valve.

4. In an automobile provided with a fluid braking system and a clutch pedal, control means cooperating with the braking system to prevent release of the brakes from the applied position, said control means comprising a body having a passage therethrough for the fluid of the braking system; a valve seat formed in the body within the passage; a valve member in the passage; a spring to yieldably hold the member on said seat to prevent the flow of fluid in a direction to release the brakes; and a control shaft provided with a shoulder extending longitudinally of the passage, said valve member being in the form of a cylinder in longitudinal alignment with the control shaft, said body having a cam face over which said shoulder rides as the control shaft is rotated, said cam face being formed to shift the said shaft longitudinally toward the valve member a distance sufficient to move the valve member from the valve seat as the shaft is rotated in one direction about its axis, said cam face being on a section of the body providing a journal for the said control shaft.

5. In an automobile provided with a fluid braking system and a clutch pedal, control means cooperating with the braking system to prevent release of the brakes from the applied position, said control means comprising a body having a passage therethrough for the fluid of the braking system; a valve seat formed in the body within the passage; a valve member in the passage; a spring to yieldably hold the member on said seat to prevent the flow of fluid in a direction to release the brakes; and a control shaft provided with a shoulder extending longitudinally of the passage, said valve member being in the form of a cylinder in longitudinal alignment with the control shaft, said body having a cam face over which said shoulder rides as the control shaft is rotated, said cam face being formed to shift the said shaft longitudinally toward the valve member a distance sufficient to move the valve member from the valve seat as the shaft is rotated in one direction about its axis, said cam face being on a section of the body providing a journal for the said control shaft, said section of the body having means for detachably affixing the same in place with the control shaft projecting longitudinally into the passage of the body.

6. In the fluid braking system of an automobile, control means for preventing the release of the brakes from the applied position comprising a body having a passage extending longitudinally therethrough and in connection with the fluid tube leading from the master cylinder; a valve seat circumscribing the passage; a valve member reciprocably disposed in the passage for movement toward and from a position against the valve seat; a spring to yieldably hold the valve member against the seat; a control shaft journalled in the body for rotation about its axis and for longitudinal reciprocation; a cam face formed on the body; and a shoulder on the control shaft in engagement with the cam face, said control shaft and the valve member being in longitudinal alignment.

7. In the fluid braking system of an automobile, control means for preventing the release of the brakes from the applied position comprising a body having a passage extending longitudinally therethrough and in connection with the fluid tube leading from the master cylinder; a valve seat circumscribing the passage; a valve member reciprocably disposed in the passage for movement toward and from a position against the valve seat; a spring to yieldably hold the valve member against the seat; a control shaft journalled in the body for rotation about its axis and for longitudinal reciprocation; a cam face formed on the body; and a shoulder on the control shaft in engagement with the cam face, said control shaft and the valve member being in longitudinal alignment, said passage through the body having a restricted portion slidably journalling the valve member, said valve member having a series of longitudinal grooves therein for the passage of fluid when the member is held in the unseated position by the control shaft.

AUDIE ROSS PATRICK.